United States Patent [19]

Koorneef et al.

[11] 3,855,618

[45] Dec. 17, 1974

[54] MAGNETIC HEAD HAVING VARIABLE GAP LENGTH

[75] Inventors: Jacob Koorneef; Jan Antoon Ludolf Potgiesser; Anthonie Walraven, all of Emmasingel, Eindhoven, Netherlands

[73] Assignee: U.S. Philips Corporation, New York, N.Y.

[22] Filed: Oct. 9, 1973

[21] Appl. No.: 404,357

[30] Foreign Application Priority Data

Oct. 27, 1972 Netherlands .......................... 7214548

[52] U.S. Cl. ...................... 360/69, 360/62, 360/119, 360/125

[51] Int. Cl. ......................... G11b 15/02, G11b 5/24

[58] Field of Search ........... 179/100.2 C, 100.2 CA; 340/174.1 F; 346/74 MC; 274/4 A; 360/119, 120, 121, 125–127, 69, 75, 62

[56] References Cited

UNITED STATES PATENTS

| | | | |
|---|---|---|---|
| 2,822,428 | 2/1958 | Wood | 179/100.2 CA |
| 2,928,906 | 3/1960 | Gernert | 179/100.2 CA |
| 3,043,919 | 7/1962 | Tannenbaum et al. | 179/100.2 CA |
| 3,706,861 | 12/1972 | Giel | 179/100.2 CA |

*Primary Examiner*—Bernard Konick
*Assistant Examiner*—Robert S. Tupper
*Attorney, Agent, or Firm*—Frank R. Trifari

[57] ABSTRACT

A magnetic head being provided with at least one electromechanical transducer, in which the distance between the gap bounding faces can be varied so as to be relatively long during recording and relatively short during playback. Electrostrictive transducers are preferably used which are energized by means of a control voltage controlled by a recording signal and a playback signal.

8 Claims, 7 Drawing Figures

MAGNETIC HEAD HAVING VARIABLE GAP LENGTH

Figure 1:
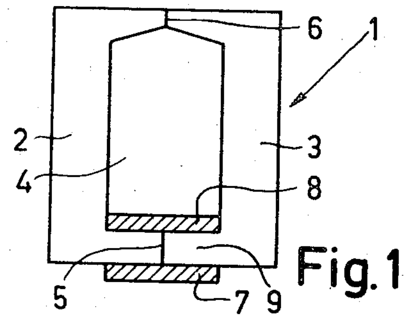

The invention relates to a magnetic head comprising a core of a magnetisable material which has at least one electric winding and which has a side destined to cooperate with a magnetisable recording medium, the said side being provided with two oppositely located gap bounding faces which enclose a transducing gap having a variable operative gap length.

Magnetic heads for recording and playing back magnetic recordings are known. In accordance with the purpose for which they are to be used, they have different constructions. For example, a recording head generally has a larger gap length as compared with a playback head. The gap length is to be understood to mean herein the distance between the gap bounding faces. The length of the gap of a recording head is determined by the wavelength region, the coercive force and the thickness of the recording medium used and the saturation behaviour of the core material. On the contrary, the gap length of a playback head should be chosen to be so small that also the highest frequencies are played back. For apparatus in which combined recording and/or playback heads are used for reasons of cost-price or system, this results in a compromise for the length of the common recording gap. In digital disc memories, for example, the gap length is determined by the requirement that it must be possible to record new information on information already recorded in the magnetic layer of the recording medium by the head floating at a given small distance, so that a comparatively long gap length has to be used which is unfavourable for playing back.

From the U.S. Pat. Specification 3,480,935 a magnetic head is known which has a gap of variable gap length in which two layers of material are present in the transducing gap of which the former consists of a soft magnetic material having a lower saturation than the material of the core and the latter consists of a non-magnetic material. During a recording operation the former material is satured by the high bias magnetisation current used, the permeability approaching that of air. The former layer is then magnetically inoperative and for recording a non magnetic recording gap is available which has an operative length which is equal to the collective thickness of the two layers. During a playback operation, when no bias magnetisation current is used, the layer of the former material is not saturated and then has a high relative permeability. The result is that during playing back the operative length of the transducing gap is determined only by the thickness of the second non-magnetic layer.

A drawback of this known head is that the gap "breathes" as a function of the bias magnetisation current so that a gap having an accurately defined gap length is not available for recording. A further drawback is that it is not possible to continuously vary the effective length of the transducing gap, which may be desirable for certain applications, for example, adapting the gap length to the frequency of a signal to be recorded, to the tape speed or to the quality of the tape to be recorded.

Moreover there are applications in which a long recording gap and a short playback gap are particularly desirable but in which no bias magnetisation current is used (as in disk memories). In that case it is not at all possible to use the above described way of gap length variation.

It is the object of the invention to provide a construction of a magnetic head which does not exhibit the above-mentioned drawbacks.

For that purpose, the magnetic head according to the invention is characterized in that at least one electromechanical, preferably electrostrictive, transducer is secured to the core, said transducer being provided with two electrodes to which a control voltage is to be supplied so as to influence the distance between the gap bounding faces by a variation in length of the transducer.

In the head according to the invention, the operative gap length which in this case is directly determined by the distance between the gap bounding faces, is electrically adjustable independently of the bias magnetisation current. This means that the adjustment of the gap length can occur in discrete steps, while any desired gap length is adjustable within a certain range.

A first embodiment of the magnetic head according to the invention is characterized in that the control voltage to be supplied to the electrodes of the transducer is controlled by a recording and playback signal, respectively. Said coupling of the recording signal and playback signal, respectively, to the control signal for the gap adjustment has the advantage that the head can be operated without further measures from the outside.

Although in principle any electromechanical transducer may be used so as to make the gap length electrically adjustable, the use of electrostrictive transducers is to be preferred due to the small possibility of cross-talk (such transducers convey little current or convey no current at all), while the mechanical properties, in particular the coefficient of expansion, are readily adapted to those of ferrite which is a generally used core material for magnetic heads.

A further embodiment of the magnetic head according to the invention is therefore characterized in that at least one electrostrictive transducer which upon energization acts as an active bending element is secured to the core. Such a transducer may be used so as to bend apart or bend towards each other the parts of the head which enclose the recording gap. Although very simple constructions are possible, a drawback is that the material of the core upon bending comes under a mechanical stress.

The use of an electrostrictive transducer which upon energization acts as a linear displacing element is therefore to be preferred. With such a transducer, constructions are possible in which the gap bounding faces remain parallel when the gap length varies, so that the material of the core does not come under a stress.

Since the electric windings placed on a core generally occupy much space, it will be difficult in certain cases to find room for the connection of another one or more transducers to the core.

A further embodiment of the magnetic head according to the invention is characterized in that the core comprises two oppositely located parts which are provided with gap bounding faces enclosing a transducing gap, that plates of a non-magnetisable material are provided on the faces of said parts which are parallel to the gap bounding faces and which project beyond the parts, and that said plates are mechanically connected together by two electrostrictive transducers. In this construction the two transducers are not directly provided on the core and the space created between the core and the transducers may be effectively used.

The invention will now be described in greater detail with reference to the drawing, the figures of which use the same reference numerals for the same components.

Figure 2:
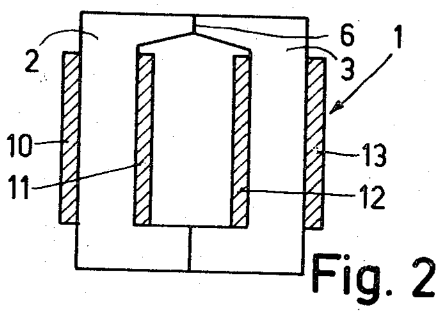
Figure 3:
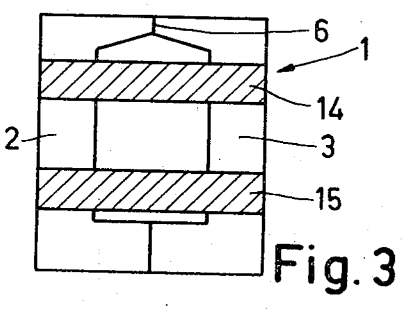
Figure 4:
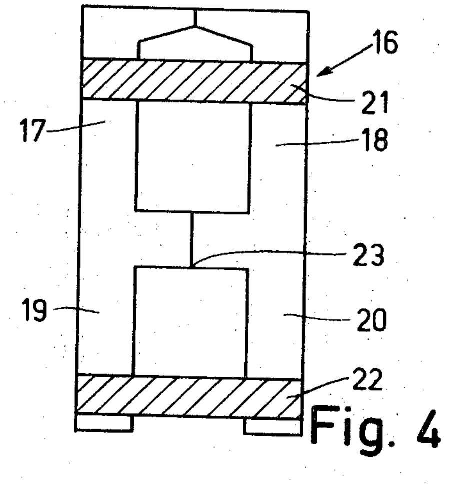
Figure 5:
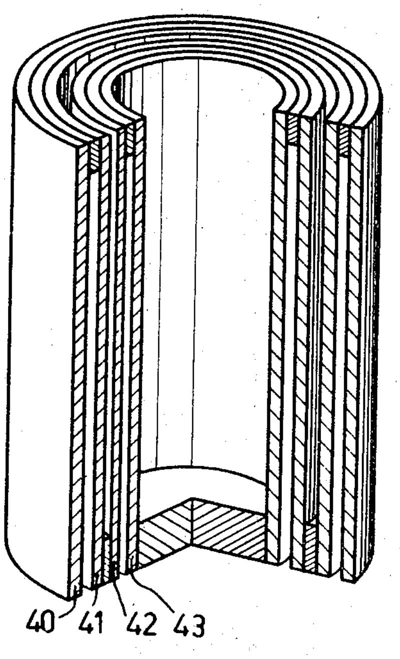
Figure 6:
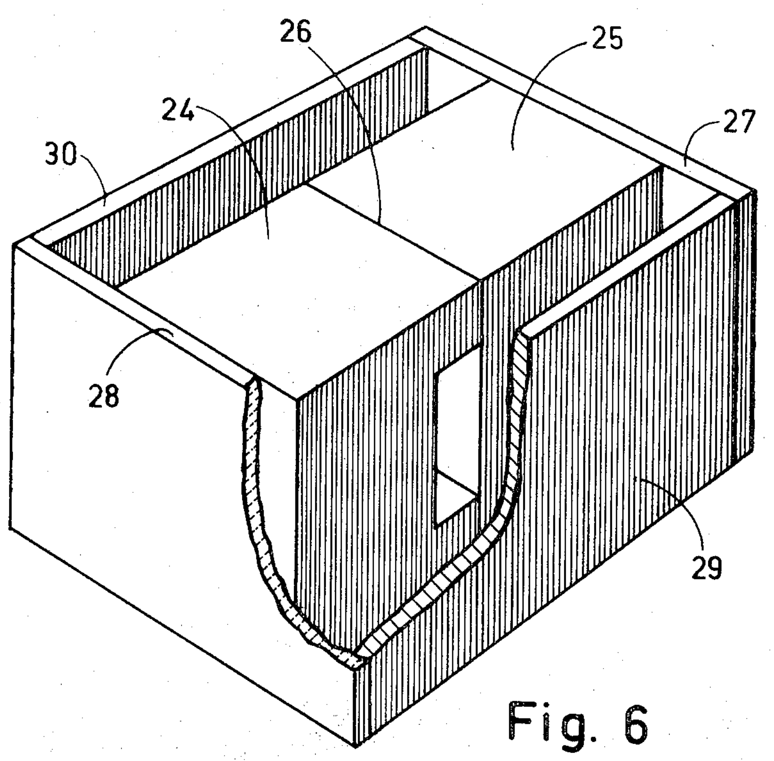
Figure 7:
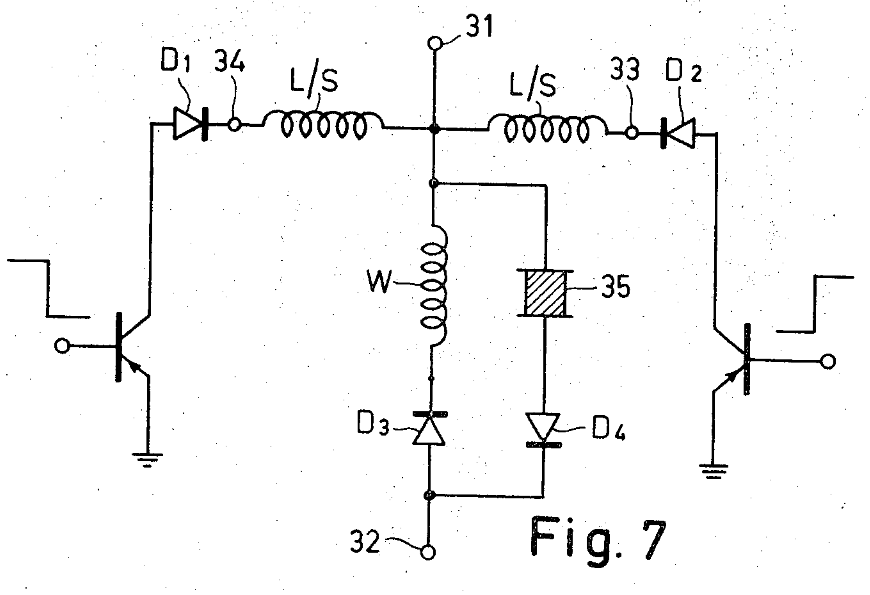

FIG. 1 is a longitudinal cross-sectional view of the core of a magnetic head having a number of bending elements secured in a first manner, FIG. 2 is a longitudinal cross-sectional view of the core of a magnetic head having a number of bending elements secured in a second manner, FIG. 3 is a longitudinal cross-sectional view of the core of a magnetic head having a number of linear displacing elements secured in a first manner, FIG. 4 is a longitudinal cross-sectional view of the core of a magnetic head having a number of linear displacing elements secured in a second manner, FIG. 5 is an isometric side elevation of a particular embodiment of an electrostrictive displacing element, FIG. 6 is an isometric side elevation of a part of a magnetic head, FIG. 7 shows a connection diagram for a magnetic head according to the invention.

The core 1 of a magnetic head shown in FIG. 1 is constructed from two C-shaped core halves 2 and 3 which enclose the winding aperture 5. The core halves 2 and 3 are manufactured from sintered oxidic ferromagnetic material (ferrite) and have abutting faces which at the area 5 are rigidly secured together and at the area 6 enclose the recording gap. 7 and 8 denote two electrostrictive transducers which are secured to the core throughout their length.

As is known, electrostrictive materials can vary their shape under the influence of an electric field. For example, a flat plate of an electrostrictive material having a direction of polarisation perpendicular to the main plane of the plate will show a certain extent of expansion or shrinkage when electrodes on the upper and lower side are connected to a voltage source, dependent upon the value and the polarity of the applied voltage. When a plate as described above, for example manufactured from a modified lead zirconate titanate available as piezoxide 5 is provided on a passively deformable support, such as a core part of ferrite, a bending element can be formed having an electrically variable radius of curvature. Although the use of one plate of electrostrictive material will do, a plate of prepolarized electrostrictive material 7, 8 is preferably secured to both sides of the core part, the direction of polarisation of the two plates and the mutual electric connection of their electrodes being such that upon connection to a voltage source the electric field strengths in the plate vary in opposite senses. In order to produce a larger distance between the core halves 2 and 3 at the area 6, that is to say an increase of the gap length, the transducer 8 should be energized so that an elongation occurs and the transducer 7 should be energized so that a shortening occurs. Variations in the gap length up to 10 $\mu$m can be achieved, for example, with a control voltage of 100 Volt.

As a direct use may be considered the digital disc memory the great number of heads and/or the selection problem of which makes the use of separate recording and playback heads too expensive.

In FIG. 2, the electrostrictive transducers 10, 11, 12 and 13 are secured to the core 1 of the magnetic head. In order to increase the gap length, the transducers 10 and 13 should be energized so that a shortening occurs and the transducers 11 and 12 should be energized so that an elongation occurs. In this case also, fewer transducers will do, for example, by providing the transducers 10 and 11 only. The advantage of the connection shown in this Figure of the transducers to the long limbs of the core havles over the way of connection shown in FIG. 1 is that a larger effect is obtained.

FIG. 3 shows a magnet core 1 to which two transducers 14 and 15 are secured over part of their length. The core consists of two C-shaped halves 2 and 3 which have abutting faces which can move relative to each other both at the area 5 and the area 6. For enlarging the gap length, the transducers should be energized so that an elongation occurs.

FIG. 4 shows a magnet core 16 of a slightly different construction. The core halves 17 and 18 have obtained elongate limbs 19 and 20, respectively. Two transducers 21 and 22 are connected to the core over part of their length. For enlarging the gap length, the transducer 21 should be energized so that an elongation occurs and the transducer 22 should be energized so that a shortening occurs. The core halves 17 and 18 can pivot about the point 23. With this construction a larger gap length variation can be obtained than with the construction shown in FIG. 3.

A particular construction of an electrostrictive displacement element with which a large displacement can nevertheless be realized in a small space is shown in FIG. 5. This element consists of a number of tubes 41, 42, 43 fitting one in the other and consisting of an electrostrictive material and capable of being energized simultaneously. Such a displacing element can advantageously be used in magnetic head constructions according to the invention.

FIG. 6 shows two core halves 24 and 25 of a magnetic head which enclose a recording gap 26. Plates of ceramic material 27 and 28 are secured to the short sides of the parts 24 and 25. Said plates are connected by the transducers 29 and 30 on either side of the head. For enlarging the gap length, the transducers 29 and 30 should be energized so that an elongation occurs. The parts 24 an 25 enclosing the gap 26 are then pulled apart.

FIG. 7 shows the electric connection of a magnetic head according to the invention. The head comprises four connection wires which can be connected to read/write amplifiers via the connection terminals 31, 32, 33 and 34. For the selection of a given head, the terminal 31 is connected to the negative voltage so that the head in question is connected to the amplifier via the selection diodes D1 and D2. When the terminal 32 is connected to earth, the erasing current required during recording flows through the erasing winding W. In the read condition, terminal 32 is also connected to the negative voltage for all the heads, so that no current flows through the erasing winding W. A compatible connection for a head having an electrostrictive transducer is obtained by connecting the electrostrictive transducer 35 having two electrodes between the terminals 31 and 32 via an extra diode D4. In the read condition it is possible to adjust the length of the recording gap with a negative voltage, terminal 32 becoming negative relative to terminal 31 without an extra connection being necessary.

What is claimed is:

1. A magnetic head for recording and playing back which comprises:

a core including first and second magnetizable pole pieces, each magnetizable pole piece having a gap bounding face, said gap bounding faces being disposed in generally opposed relation forming a transducing gap, at least one of said magnetizable pole pieces having secured thereto means for displacing said magnetizable pole piece between a recording position and a playback position thereby changing the gap length between said gap bounding faces, said means comprising an electrostrictive transducer responsive to a control voltage applied thereto, said control voltage being varied responsive to the recording mode of operation of the head and the playback mode of operation of the head.

2. The apparatus as described in claim 1 wherein each of said magnetizable pole pieces carries means for displacing said magnetizable pole piece to vary the gap length between said gap bounding faces.

3. The apparatus as claimed in claim 2 wherein each of said electrostrictive transducers has a generally planar face and each of said magnetizable pole pieces has a generally planar face, each of said electrostrictive transducers secured on said magnetizable pole pieces being disposed with the generally planar faces thereof being disposed in co-planar relationship, each of said electrostrictive transducers upon application of at least one control voltage bending the arm on which the particular transducer is carried.

4. The apparatus as claimed in claim 1 wherein said first and second magnetizable pole pieces comprise portions of discrete core halves which enclose a winding aperture, said halves being rigidly secured together in a first place and enclosing the recording gap in a second place.

5. The apparatus as described in claim 4 wherein said electrostrictive transducers are secured throughout their length to oppositely disposed planar surfaces and the control voltages supplied to said transducers have opposite signs.

6. The apparatus as described in claim 4 wherein said electrostrictive transducers are secured throughout their length to oppositely disposed planar surfaces and the control voltages supplied to said transducers have same signs.

7. The apparatus as described in claim 1 wherein two electrostrictive transducers are carried by said first and second magnetizable pole pieces and are disposed generally at right angles thereto and the control voltages supplied to said transducers have opposite signs.

8. The apparatus as described in claim 1 wherein plates of non-magnetizable material are carried on said magnetizable pole pieces, said plates having planar surfaces which are parallel to said gap bounding faces, said plates projecting beyond said magnetizable pole pieces and being mechanically coupled together by electrostrictive transducers.

* * * * *